US012373379B2

(12) United States Patent
Shaffer, Jr. et al.

(10) Patent No.: US 12,373,379 B2
(45) Date of Patent: Jul. 29, 2025

(54) GAMING DEVICE WITH A USB INTERFACE FOR DELIVERING POWER AND DATA TO VIDEO DISPLAY MODULES

(71) Applicant: Aristocrat Technologies, Inc., Las Vegas, NV (US)

(72) Inventors: Stephen Shaffer, Jr., Las Vegas, NV (US); Frank Rodriguez, Las Vegas, NV (US); Rajendrasinh Jadeja, Las Vegas, NV (US); Xiaoqiang Gong, Henderson, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 66 days.

(21) Appl. No.: 18/353,816

(22) Filed: Jul. 17, 2023

(65) Prior Publication Data

US 2024/0028549 A1 Jan. 25, 2024

Related U.S. Application Data

(60) Provisional application No. 63/390,809, filed on Jul. 20, 2022.

(51) Int. Cl.
*G06F 13/42* (2006.01)
*G06F 13/38* (2006.01)

(52) U.S. Cl.
CPC ........ *G06F 13/4282* (2013.01); *G06F 13/382* (2013.01); *G06F 2213/0042* (2013.01)

(58) Field of Classification Search
CPC .............. G06F 13/4282; G06F 13/382; G06F 2213/0042
See application file for complete search history.

(56) References Cited

U.S. PATENT DOCUMENTS

| | | | |
|---|---|---|---|
| 9,372,656 B2 | 6/2016 | Ma | |
| 9,971,719 B2 | 5/2018 | Pan | |
| 10,268,627 B2 | 4/2019 | Schnell | |
| 10,289,584 B2 | 5/2019 | Chiba | |
| 11,169,589 B2 | 11/2021 | Regupathy | |
| 2003/0054880 A1* | 3/2003 | Lam | G07F 17/32 463/29 |
| 2008/0122825 A1* | 5/2008 | Choi | G06F 3/147 345/211 |
| 2012/0066425 A1* | 3/2012 | Zeng | G06F 13/14 710/303 |
| 2016/0191256 A1* | 6/2016 | Wendt | G06F 1/26 713/300 |
| 2018/0060270 A1* | 3/2018 | Schnell | G06F 13/4022 |
| 2020/0350997 A1* | 11/2020 | Giziewicz | H04B 10/40 |

* cited by examiner

*Primary Examiner* — Henry Tsai
*Assistant Examiner* — Harry Z Wang
(74) *Attorney, Agent, or Firm* — Weaver Austin Villeneuve & Sampson LLP

(57) ABSTRACT

A gaming device uses a USB interface for power delivery and data transmission. In non-limiting examples, the USB interface may be a universal serial bus (USB) C-type cable communicatively and electrically connecting multiple electronic gaming devices and/or auxiliary devices, such as monitors, thereby reducing the number of cables for power and data delivery between machines and/or devices.

16 Claims, 9 Drawing Sheets

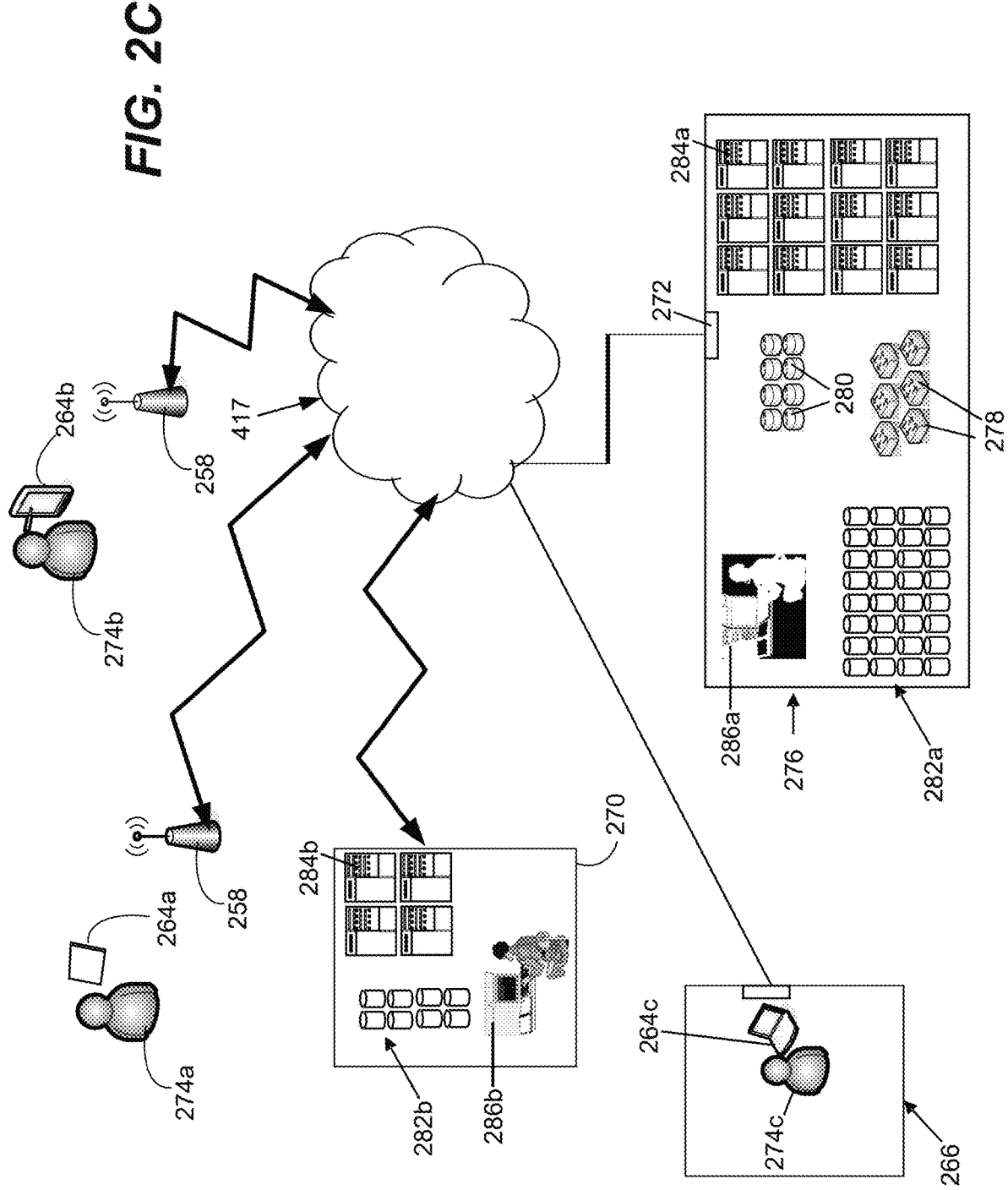

GAMING DEVICE WITH A USB INTERFACE FOR DELIVERING POWER AND DATA TO VIDEO DISPLAY MODULES

RELATED APPLICATION

The present application claims priority to U.S. Provisional Patent Application No. 63/390,809, filed Jul. 20, 2022, and entitled "SYSTEMS AND METHODS FOR DATA AND POWER DELIVERY FOR GAMING APPLICATIONS VIA USB-C CABLE" which is hereby incorporated by reference in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

A gaming device may include a cabinet construction containing a host control module and a plurality of individual components (e.g., multiple monitors, speakers, lighting devices, cameras, microphones, etc.). In conventional gaming devices, each one of these components may be communicatively and electrically connected to the host control module via multiple separate cables that perform different functions. For example, a monitor having a resolution of at least 3840×2160 at 60 frames or more per second may be communicatively and electrically connected to the host control module via a multiple power cables and multiple separate data cables that transmit data (e.g., data cables transmitting video signals via DisplayPort, USB connections for touch communication, USB connections for edge lighting, USB connections for camera input, USB connections for microphone input, etc.). Because each component may connect to the host control module via multiple cables and the gaming device may have multiple components, it may be cumbersome to assemble, repair, and maintain the gaming device. In other implementations, the monitor may a resolution greater or less than 3840×2160 at 60 frames or more per second (e.g., where the gaming device includes button decks and/or a main monitor is a laser-cut LCD for a custom aspect ratio and thus a custom resolution, etc.).

In the present disclosure, the gaming device may use a single USB-C cable in connection between a host control module and a first video display module and an additional single USB-C cable in connection between the first video display module and a second video display module for power delivery and data transmission. Each module may include a monitor and many peripheral components of the electronic gaming machine (EGM). The USB-C cable may implement a USB connector system that combines multiple protocols in a single cable to offload many peripheral component connections from the EGM into the module, which simplifies connections and enables a reduction in the number of cables to one USB-C cable connecting one module to another module. The use of a single cable may simplify connections thereby simplifying repair or maintenance and decreasing associated costs. Furthermore, the disclosed single USB-C cable may be capable of delivering 100 W, 140 W, 180 W, 240 W, or more of power, thereby enabling a single cable to deliver power to more components at higher power levels than conventional designs.

A gaming device is provided that may include a host control module having a host USB controller, a game controller communicatively connected to the host USB controller to transmit data, and a power source electrically connected to the host USB controller to deliver power. The gaming device may further include a first video display module having a first USB controller and a first video monitor communicatively and electrically connected to the first USB controller. The gaming device may optionally further include a second video display module having a second USB controller and a second video monitor communicatively and electrically connected to the second USB controller. The first USB controller may be configured to receive, via a first USB interface, first power and first data originating from the host USB controller and to transmit the first data and deliver at least some of the first power to the first video monitor. The second USB controller may be configured to receive, via a second single USB interface, second power and second data originating from the host USB controller and to transmit the second data and to deliver at least some of the second power to the second video monitor and the one or more second peripheral components. A Unified USB Data and Power Distribution System may include the host USB controller, the first USB controller, and the second USB controller. The Unified USB Data and Power Distribution System may include a plurality of processors and a plurality of memory devices. The one or more memory devices may store computer-executable instructions which, when executed by the one or more processors, cause the one or more processors to cause the processors to collectively deliver at least the first power to the first USB controller via the first USB interface responsive, at least in part, to the one or more processors receiving a request for the first power from the first USB controller via the first USB interface. The one or more memory devices may also store computer-executable instructions which, when executed by the one or more processors, cause the one or more processors to cause the processors to collectively allocate at least some of the first power to the first video monitor and at least some of the second power to the second video monitor responsive, at least in part, to the first USB controller receiving the first power originating from the host USB controller and the second USB controller receiving the second power originating from the host USB controller.

The host control module may be communicatively and electrically connected to the first video display module, and the first video display module may be communicatively and electrically connected to the second video display module, thereby connecting the host control module, the first video display module, and the second video display module in a serial combination.

The memory devices may store computer-executable instructions which, when executed by the one or more processors, cause the one or more processors to cause the processors to deliver an amount of power to the first video display module, the amount of power being at least the sum total of the first power and the second power. The memory devices may also store computer-executable instructions which, when executed by the one or more processors, cause the one or more processors to cause the processors to allocate at least the second power from the first USB controller to the second USB controller responsive, at least in part, to the first video display module receiving the amount of power.

The host control module may be communicatively and electrically connected directly to the first video display module, and the host control module may be further communicatively and electrically connected directly to the second video display module, thereby communicatively and electrically connecting the first video display module and the second video display module in a parallel combination with the host USB controller.

The memory devices may store computer-executable instructions which, when executed by the one or more processors, cause the one or more processors to cause the processors to deliver an amount of power to the first video display module, with the amount of power being at least the first power. The memory devices may store computer-executable instructions which, when executed by the one or more processors, cause the one or more processors to cause the processors to deliver an additional amount of power to the second video display module, the additional amount of power being at least the second power.

The first USB interface and/or the second USB interface may include a USB cable capable of delivering at least 240 W and carrying a data transfer speed of at least 40 Gbps.

The one or more first peripheral components may be communicatively and electrically connected to the first USB controller, and the first USB controller may be configured to transmit the first data and deliver at least some of the first power from the first USB controller to the one or more first peripheral components.

The one or more second peripheral components may be communicatively and electrically connected to the second USB controller, and the second USB controller may be configured to transmit the second data and deliver at least some of the second power to the one or more second peripheral components.

The first USB controller may include a first power delivery subsystem. The first power delivery subsystem may be configured to negotiate, via the first USB interface, with the host USB controller to request the first power.

The first video monitor and the one or more first peripheral components may be configured to collectively negotiate with the first power delivery subsystem to request the first power. The first power is at least a sum total of a plurality of first individual power levels corresponding with the first video monitor and the one or more first peripheral components.

The second USB controller may include a second power delivery subsystem. The second power delivery subsystem may be configured to negotiate, via the second USB interface, with the first USB controller to request the second power.

The second video monitor and the one or more second peripheral components may be configured to collectively negotiate with the second power delivery subsystem to request the second power. The second power may be at least a sum total of a plurality of second individual power levels corresponding with the second video monitor and the one or more second peripheral components.

The one or more memory devices may further store additional computer-executable instructions which, when executed by the one or more processors, further cause the one or more processors to compare a sum total of the first power and the second power to a maximum power level capacity of one or both of the first USB interface and the second USB interface. The one or more memory devices may further store additional computer-executable instructions which, when executed by the one or more processors, further cause the one or more processors to generate data associated with a remedial action responsive, at least in part, to the host USB controller determining that the sum total of the first power and the second power exceeds the maximum power level capacity.

The first USB controller may include a first video logic subsystem configured to generate an input signal responsive, at least in part, to the first video logic subsystem receiving the data associated with the remedial action from the processors. The first video display module may further include a display control subsystem configured to generate a video signal responsive, at least in part, to the display control subsystem receiving the input signal from the first video logic subsystem. The first video monitor may present a notification responsive, at least in part, to the first video monitor receiving the video signal from the display control subsystem. The notification may include a prompt to install an additional USB interface to connect the host USB controller with the first video display module or the second video display module.

The second USB controller may include a second video logic subsystem configured to generate an input signal responsive, at least in part, to the second video logic subsystem receiving the data associated with the remedial action from the processors. The second video display module may further include a display control subsystem configured to generate a video signal responsive, at least in part, to the display control subsystem receiving the input signal from the second video logic subsystem. The second video monitor may present a notification responsive, at least in part, to the second video monitor receiving the video signal from the display control subsystem. The notification may include a prompt to install an additional USB interface to connect the host USB controller with the first video display module or the second video display module.

The first USB controller may include a first power delivery subsystem that is configured to stop delivering at least some of the first power to one or more of the first peripheral components responsive, at least in part, to the first USB controller receiving the data associated with the remedial action from the host USB controller.

The second USB controller may include a second power delivery subsystem that is configured to stop delivering at least some of the second power to one or more of the second peripheral components responsive, at least in part, to the second USB controller receiving the data associated with the remedial action from the first USB controller.

The first video monitor and/or the second video monitor may have a resolution of at least 3840×2160 and that supports a frame rate of at least 60 frames per second.

At least one of the first peripheral components and the second peripheral components may include a touchscreen display, a lighting device, a microphone, a camera, a speaker, and/or a supplemental monitor.

The first peripheral components and/or the second peripheral components may include a DisplayPort connector supporting a monitor having a resolution of at least 3840×160 at 60 frames per second, a USB-A connector for touch control data, a USB-A connector for lighting data, a USB-A connector for mono microphone data, a USB-A connector for a full HD at 30 frames per second camera, a USB-A connector for USB audio, a USB-C Power Delivery connector for an additional monitor, an HDMI connector, and/or a power output for the first video monitor or the second video monitor via a Molex/Amphenol header.

A method may be provided for configuring a gaming device. The method may include transmitting, using a first USB interface, first power and first data originating from a host USB controller to a first USB controller of a first video display module. The method may further include transmitting the first data and at least some of the first power from the first USB controller to a first video monitor of the first video display module. The method may further include transmitting, using a second USB interface, second power and second data originating from the host USB controller to a second USB controller of a second video display module. The method may further include transmitting the second data and at least some of the second power from the second USB controller to a second video monitor.

The method may further include transmitting the first data and at least some of the first power from the first USB controller to one or more first peripheral components.

The method may further include transmitting the second data and at least some of the second power from the second USB controller to one or more second peripheral components.

The method may further include negotiating, using a first power delivery subsystem via the first USB interface, with the host USB controller to request the first power.

The method may further include negotiating, using the first video monitor and the one or more first peripheral components collectively, with the first delivery power subsystem to request the first power. The first power is at least a sum total of a plurality of first individual power levels corresponding with the first video monitor and the one or more first peripheral components.

The method may further include negotiating, using a second power delivery subsystem of the second USB controller via the second USB interface, with the first USB controller to request the second power.

The method may further include negotiating, using the second video monitor and the one or more second peripheral components collectively, with the second power delivery subsystem to request the second power. The second power is at least a sum total of a plurality of second individual power levels corresponding with the second video monitor and the one or more second peripheral components.

The method may further include comparing, using the host USB controller, the amount of power to maximum power level capacity of the USB interface. The method may further include generating, using the host USB controller, data associated with a remedial action responsive, at least in part, to the host USB controller determining that the amount of power exceeds the maximum power level capacity.

The method may further include generating, using a first video logic subsystem of the first USB controller, an input signal responsive, at least in part, to the first video logic subsystem receiving the data associated with the remedial action from the host USB controller. The method may further include generating, using a display control subsystem of the first video display module, a video signal responsive, at least in part, to the display control subsystem receiving the input signal from the first video logic subsystem. The method may further include presenting, using the first video monitor, a notification responsive, at least in part, to the first video monitor receiving the video signal from the display control subsystem. The method may further include prompting, using the notification, an installation of an additional USB interface to connect the host USB controller with the first video display module or the second video display module.

The method may further include generating, using a second video logic subsystem of the second USB controller, an input signal responsive, at least in part, to the second video logic subsystem receiving the data associated with the remedial action from the first USB controller. The method may further include generating, using a display control subsystem of the second video display module, a video signal responsive, at least in part, to the display control subsystem receiving the input signal from the second video logic subsystem. The method may further include presenting, using the second video monitor, a notification responsive, at least in part, to the second video monitor receiving the video signal from the display control subsystem. The method may further include prompting, using the notification, an installation of an additional USB interface to connect the host USB controller with the first video display module or the second video display module.

The method may further include stopping, using a first power delivery subsystem of the first USB controller, delivery of at least some of the first power to the first video monitor or one or more of the first peripheral components responsive, at least in part, to the first USB controller receiving the data associated with the remedial action from the host USB controller.

The method may further include stopping, using a second power delivery subsystem of the second USB controller, delivery of power to the second video monitor or one or more of the second peripheral components responsive, at least in part, to the second USB controller receiving the data associated with the remedial action from the first USB controller.

One or more non-transitory computer-readable media may store computer-executable instructions which, when executed by one or more processors, cause the one or more processors to cause a first power originating from a host USB controller of a host control module to be delivered, via a first USB interface, to a first USB controller of a first video display module responsive, at least in part, to the processor receiving from the first USB controller a request for the first power. The one or more non-transitory computer-readable media may store additional computer-executable instructions which, when executed by one or more processors, cause the one or more processors to cause at least some of the first power to be allocated from the first USB controller to a first video monitor of the first video display module responsive, at least in part, to the first USB controller receiving the first power originating from the host USB controller. The one or more non-transitory computer-readable media may store additional computer-executable instructions which, when executed by one or more processors, cause the one or more processors to cause a second power originating from the host USB controller of the host control module to be delivered, via a second USB interface, to a second video display module responsive, at least in part, to the processor receiving from the first USB controller a request for the first power. The one or more non-transitory computer-readable media may store additional computer-executable instructions which, when executed by one or more processors, cause the one or more processors to cause at least some of the second power to be allocated from the second USB controller to a second video monitor of the second video display module responsive, at least in part, to the second USB controller receiving the second power originating from the host USB controller.

The one or more computer-readable media may store additional computer-executable instructions which, when executed by one or more processors, cause the one or more processors to cause a first video monitor and one or more first peripheral components to negotiate with the first USB controller to collectively request the first power, and the first power being at least a sum total of a plurality of first individual power levels corresponding with the first video monitor and the one or more first peripheral components.

The one or more computer-readable media may store additional computer-executable instructions which, when executed by one or more processors, cause the one or more processors to cause a first power delivery subsystem of the first USB controller to negotiate, via the first USB interface, with the host USB controller to request at least the first power.

The one or more computer-readable media may store additional computer-executable instructions which, when executed by one or more processors, cause the one or more processors to cause a second video monitor and one or more second peripheral components to negotiate with a second USB controller to request the second power. The second power is at least a sum total of a plurality of second individual power levels corresponding with the second video monitor and the one or more second peripheral components.

The one or more computer-readable media may store additional computer-executable instructions which, when executed by one or more processors, cause the one or more processors to cause a second power delivery subsystem of the second USB controller to negotiate, via the second USB interface, with the first USB controller to request the second power.

The one or more computer-readable media may store additional computer-executable instructions which, when executed by one or more processors, cause the one or more processors to cause the host USB controller to compare a sum total of the first power and the second power to a maximum power level capacity of one or both the first USB interface and the second USB interface. The one or more computer-readable media may store additional computer-executable instructions which, when executed by one or more processors, cause the one or more processors to cause, responsive, at least in part, to the host USB controller determining that the sum total of the first power and the second power exceeds the maximum power level capacity, the host USB controller to generate data associated with a remedial action.

The one or more computer-readable media may store additional computer-executable instructions which, when executed by one or more processors, cause the one or more processors to cause, responsive, at least in part, to a first video logic subsystem of the first USB controller receiving data associated with the remedial action, the first video logic subsystem to generate an input signal. The one or more computer-readable media may store additional computer-executable instructions which, when executed by one or more processors, cause the one or more processors to cause, responsive, at least in part, to a display control subsystem of the first video display module receiving the input signal from the first video logic subsystem, the display control subsystem to generate a video signal. The one or more computer-readable media may store additional computer-executable instructions which, when executed by one or more processors, cause the one or more processors to cause, responsive, at least in part, to the first video monitor receiving the video signal from the display control subsystem, the first video monitor to present a notification. The notification may include a prompt to install an additional USB interface to connect the host USB controller with the first video display module or the second video display module.

The one or more computer-readable media may store additional computer-executable instructions which, when executed by one or more processors, cause the one or more processors to cause, responsive, at least in part, to a second video logic subsystem of the second USB controller receiving data associated with the remedial action, the second video logic subsystem to generate an input signal. The one or more computer-readable media may store additional computer-executable instructions which, when executed by one or more processors, cause the one or more processors to cause, responsive, at least in part, to a display control subsystem of the second video display module receiving the input signal from the second video logic subsystem, the display control subsystem to generate a video signal. The one or more computer-readable media may store additional computer-executable instructions which, when executed by one or more processors, cause the one or more processors to cause, responsive, at least in part, to a second video monitor receiving the video signal from the display control subsystem, the second video monitor to present a notification. The notification may include a prompt to install an additional USB interface to connect the host USB controller with the first video display module or the second video display module.

The one or more computer-readable media may store additional computer-executable instructions which, when executed by one or more processors, cause the one or more processors to cause, responsive, at least in part, to a first power delivery subsystem of the first USB controller receiving data associated with the remedial action from the host USB controller, the first power delivery subsystem to stop delivering at least some of the first power to one or more first peripheral components.

The one or more computer-readable media may store additional computer-executable instructions which, when executed by one or more processors, cause the one or more processors to cause, responsive, at least in part, to a second power delivery subsystem of the second USB controller receiving data associated with the remedial action from the first USB controller, the second power delivery subsystem to stop delivering at least some of the second power to one or more of second peripheral components.

BRIEF DESCRIPTION OF THE DRAWINGS

FIG. 2C is a diagram that shows examples of components of a system for providing online gaming according to some aspects of the present disclosure.

DETAILED DESCRIPTION

A gaming device uses a single USB-C cable in connection between a host control module and a first video display module and an additional single USB-C cable in connection between the first video display module and a second video display module for power delivery and data transmission. Each module may include a monitor and many peripheral components of the electronic gaming machine (EGM). The USB-C cable may implement a 24-pin USB connector system with a rotationally symmetric connector that combines multiple protocols in a single cable (including DisplayPort, peripheral component interconnect express (PCIe) or Thunderbolt 4 protocol). This enables offloading many peripheral components from the EGM into the module, as well as reducing the number of cables previously going into the module from multiple cables down to one USB-C cable.

The disclosed single USB-C cable provides advantages over conventional systems with modules which employ multiple ports for various protocols as well as dedicated cabling between each port. The use of a single cable simplifies connections and thereby simplifies manufacturing, repair or maintenance, and reduces component cost. Furthermore, the disclosed single USB-C cable is capable of delivering 100 W of power, 140 W of power, 180 W of power, 240 W of power, or more, enabling a single cable to deliver power to more components at higher power levels than conventional designs.

Figure 1:
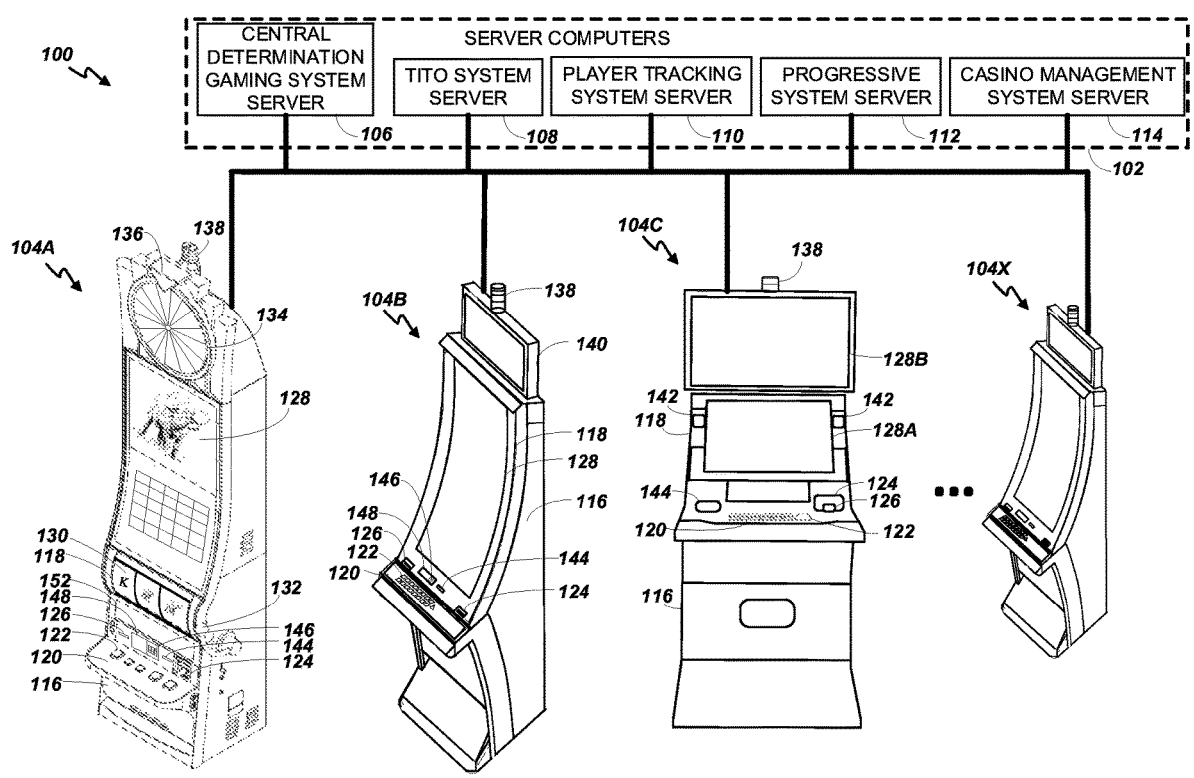
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104E3 or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
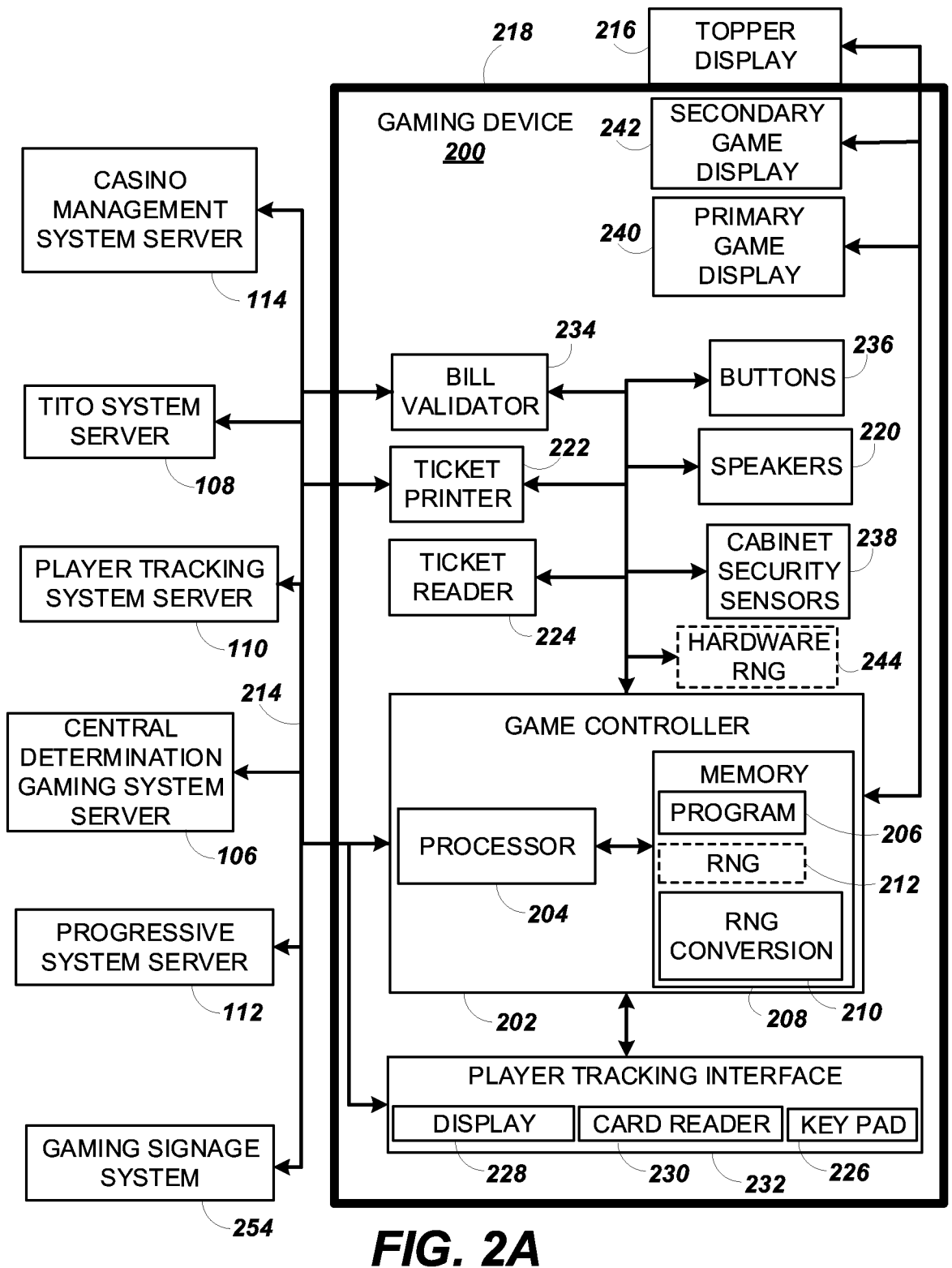
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated subsystem (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
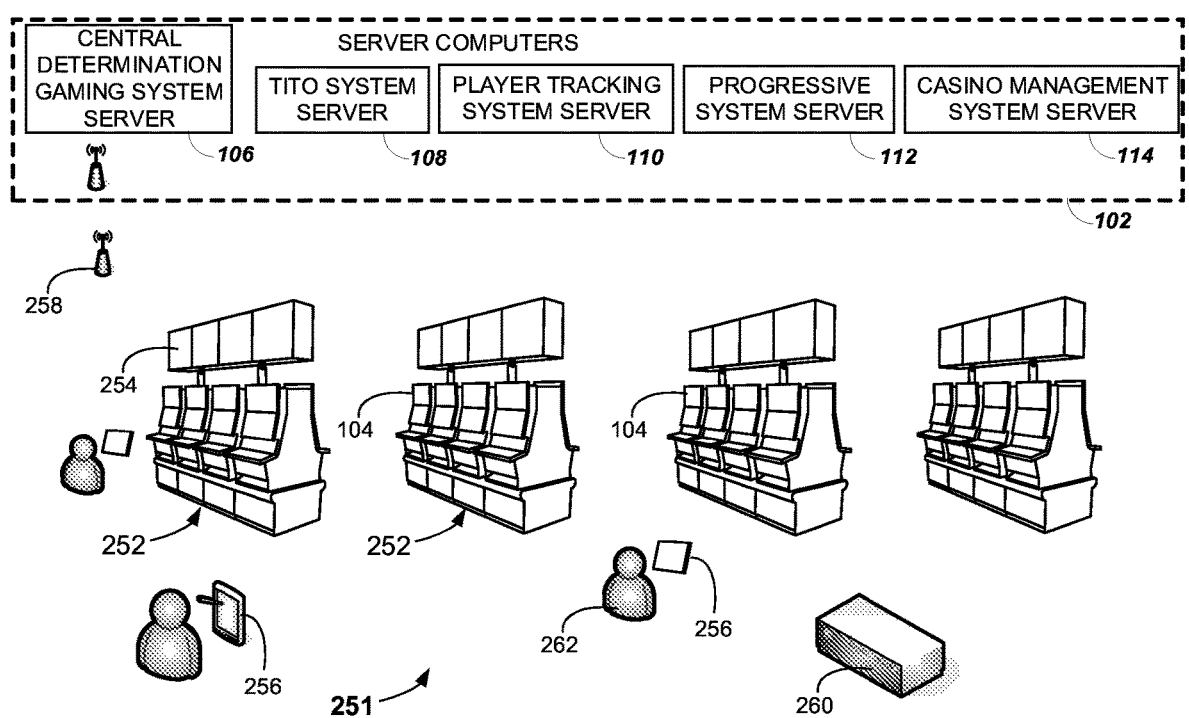
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
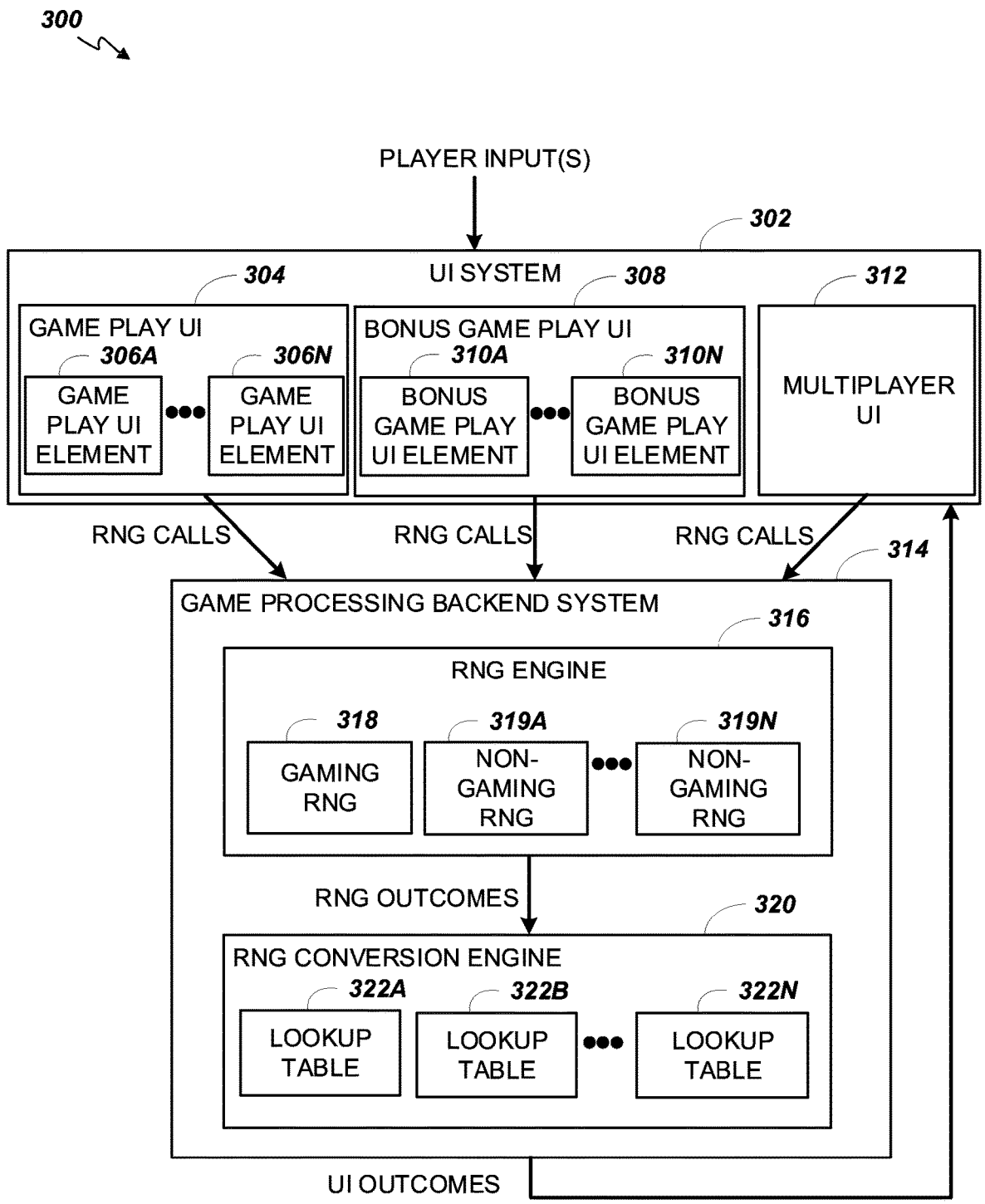
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
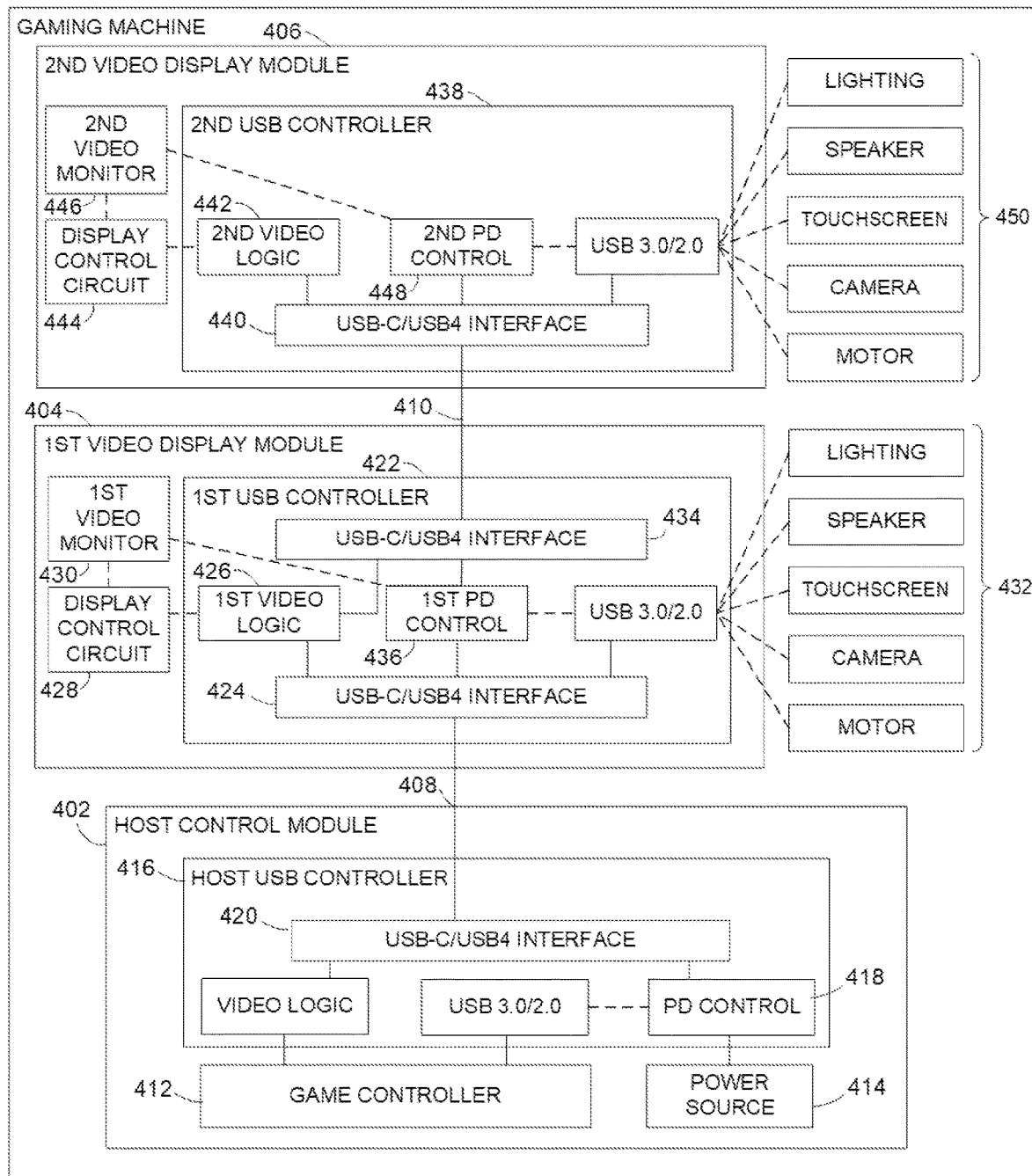
FIG. 4 depicts, in block diagram form, an implementation of a gaming device having USB interfaces connecting a host control module, a first video display module, and a second video display module in a serial combination for power delivery and data transmission.

FIG. 4 illustrates, in block diagram form, an example gaming device 400 in accordance with various implementations described herein. The gaming device 400 has a cabinet construction which may be aligned with other similar gaming devices in rows or banks for placement and operation on a casino floor. As described in detail below, the gaming device 400 includes a host control module 402 (e.g., a gaming control box), a first video display module 404 (e.g., a main video device), and a second video display module 406 (e.g., a top video device) that are connected serially (i.e., daisy-chained). The host control module 402 is communicatively and electrically connected to the first video display module 404 via a first USB interface 408 (e.g., a USB-C cable) for power delivery and data transmission, and the first video display module 404 is communicatively and electrically connected to the second video display module 406 via a second USB interface 410 for power delivery and data transmission. In some implementations, one or both of the USB interfaces 408, 410 may be USB-C cables configured to carry at least 240 W of power and transfer data at 40 Gbps or higher. The first USB interface 408 and/or the second USB interface 410 may include a cable (e.g., with a USB 2.0 connector, a USB 3.0 connector, a USB 3.1 connector, a USB 3.2 connector, a USB4 connector, a USB4 V2.0 connector, etc.) configured to transmit more or less than 240 W of power and have a data transfer speed that is above or below than 40 Gbps. However, in some implementations, the first USB interface 408 may include a USB 2.0 or higher connector supporting at least 2.5 W of power delivery for powering high-power and high-data devices. As also described in detail below, the gaming device 400 includes one or more non-transitory computer readable media causing components of each module to communicate with one another for implementing power delivery, data transmission, and remedial action when the power required by the components exceeds a maximum power capacity (e.g., 240 W) of either one of the USB-C cables 408, 410 or a maximum power that the host control module 402 can provide. The use of a single cable for power delivery and data transmission between modules that are connected serially simplifies those connections and thereby simplifies manufacturing, repair or maintenance of the gaming machine, and decreases associated costs.

The host control module 402 includes a game controller 412 with one or more processors and one or more memory devices. The game controller 412 generates data and/or instructions corresponding with the first video display module 404 and the second video display module 406. As described in detail below, the game controller 412 further includes a host USB controller 416 having a video logic subsystem communicatively and electrically connected to the game controller 412 and configured to receive data therefrom. The host USB controller 416 further includes an output interface 420 (e.g., USB-C/USB 4.0 interface) for transmitting that data. The host USB controller 416 further includes a power source 414 and a power delivery control subsystem 418 (PD control), which is electrically connected to the power source 414 and configured to receive power therefrom. The host controller 416 delivers power via the output interface 420. As described in detail below, the host USB controller 416 includes one or more processors and one or more memory devices (e.g., non-transitory computer readable media, etc.) storing instructions which, when executed by one or more processors, cause the one or more processors to cause a first power to be delivered and allocated to components of the first video display module 404 and a second power to be delivered and allocated to components of the second video display module 406, via the USB-C cables 408, 410.

The first video display module 404 includes a first USB controller 422 communicatively and electrically connected to the host control module 402 via the first USB interface 408. The first USB interface 408 is configured to deliver a first power (e.g., 240 W) and transmit data from the host USB controller 416 to the first USB controller 422. The first USB controller 422 has an input interface 424 (e.g., USB-C/USB 4.0 interface) connectable to the output interface 420 of the host USB controller 416 via the first USB interface 408 for power delivery and data transmission between the host control module 402 and the first video display module 404. The first USB controller 422 further includes a first video logic subsystem 426 communicatively connected to the input interface 424. The first video logic subsystem 426 is configured to generate an input signal responsive, at least in part, to the first video logic subsystem 426 receiving the data from the host USB controller 416 via the first USB interface 408. The first video display module 404 further includes a display control subsystem 428 communicatively connected to the first video logic subsystem 426. The display control subsystem 428 is configured to generate a video signal responsive, at least in part, to the display control subsystem 428 receiving the input signal from the first video logic subsystem 426. The first video display module 404 further includes a first video monitor 430 communicatively connected to the display control subsystem 428 of the first USB controller 422. The first video monitor 430 is configured to present videos and/or images corresponding with prize information, gameplay, game outcome, and the like responsive, at least in part, to the first video monitor 430 receiving the video signal from the display control subsystem 428. In this implementation, the first video monitor 430 has a resolution of at least 3840×2160 at 60 frames per second (i.e., to allows for larger resolution displays, such as 8K). In other implementations, the first video monitor may have other suitable parameters. However, it is contemplated that the monitor may a resolution greater or less than 3840×2160 at 60 frames or more per second (e.g., where the gaming device includes button decks and/or a main monitor is a laser-cut LCD for a custom aspect ratio and thus a custom resolution, etc.).

In this implementation, one or more first peripheral components 432 are communicatively and electrically connected to the input interface 424 via one or more corresponding ports (e.g., USB 3.0, USB 2.0, etc.) to receive data and at least some of the first power from the host USB controller 416 via the first USB interface 408. The first peripheral components 432 may be components that are separate from the first video display module 404. In other implementations, the first peripheral components 432 may be integral parts of the first video display module 404. One or more examples of the first peripheral components 432 may include a touchscreen display, a lighting device, a microphone, a camera, a speaker, and/or a supplemental monitor. In some implementations, the first peripheral components 432 may include at least one of a DisplayPort for a monitor having a resolution of at least 3840×2160 at 60 frames per second, a USB-C Power Delivery for a possible additional monitor instead of using the second DisplayPort, and/or a power output for the monitor via a Molex/Amphenol header. The first USB controller 422 further includes an output interface 434 (e.g., USB-C/USB 4.0 interface) for transmitting certain data that the input interface 424 receives from the output interface 420 of the host USB controller 416 via the first USB interface 408. In other implementations, the monitor may have a resolution of less than 3840×2160 at 60 frames or more per second. In yet other implementations, other examples of the first peripheral components 432 may include an audio input to an amplifier via USB or onboard audio input via local PCB traces. In still other implementations, other examples of the first peripheral components 432 may include components of a button deck (e.g., a QI wireless charging device, one or more buttons such as a main bash button, LED lighting on the button deck, a vibration/haptic feedback device, etc.).

The first video display module 404 further includes a first power delivery control subsystem 436 (first PD control), which is electrically connected to the input interface 424 to receive at least the first power from the host USB controller 416 via the first USB interface 408. As described in detail below, the first video monitor 430 is electrically connected to the first PD control 436 to receive at least some of the first power (e.g., the first power corresponding with the first video display module 404) from the host USB controller 416. The first peripheral components 432 are electrically connected to the first PD control 436 via USB 3.0 or USB 2.0 connection to receive at least some of the first power therefrom.

In a somewhat analogous manner, the second video display module 406 includes a second USB controller 438 communicatively and electrically connected to the first USB controller 422 of the first video display module 404 via the second USB interface 410. The second USB interface 410 is configured to transmit data between the first USB controller 422 and the second USB controller 438. The second USB controller 438 has an input interface 440 (e.g., USB-C/USB 4.0 interface) connectable to the output interface 434 of the first video display module 404 via the second USB interface 410 for data input/output/processing. The second USB controller 438 further includes a second video logic subsystem 442 communicatively connected to the input interface 440. The second video logic subsystem 442 is configured to generate an input signal responsive, at least in part to, the second video logic subsystem 442 receiving the data from the first USB controller 422 via the second USB interface 410. The second video display module 406 further includes a display control subsystem 444 communicatively connected to the second video logic subsystem 442. The display control subsystem 444 is configured to generate a video signal responsive, at least in part, to the display control subsystem 444 receiving the input signal from the second video logic subsystem 442. The second video display module 406 further includes a second video monitor 446 communicatively connected to the display control subsystem 444 of the second USB controller 438. The second video monitor 446 is configured to present images corresponding with prize information, gameplay, game outcome, and the like responsive, at least in part, to the second video monitor 446 receiving the video signal from the display control subsystem 444.

The second video display module 406 further includes a second power delivery control subsystem 448 (second PD control) electrically connected to the input interface 440 to receive power from the first USB controller 422 via the second USB interface 410, with the first USB controller 422 having received the second power from host USB controller 416 via the first USB interface 408. As described in detail below, the second video monitor 446 is electrically connected to the second PD control 448 to receive at least some of the second power therefrom. Similarly, the second peripheral components 450 are electrically connected to the second PD control 448 via USB 3.0 or USB 2.0 connection to receive at least some of the second power therefrom.

In operation, the components of the gaming device 400 communicate with one another (e.g., USB Power Delivery Specification Revision 3.1 via single USB-C cables) to allocate at least some of the first power to first video monitor 430 and the first peripherals and at least some of the second power to the second video monitor 346 and the second peripherals 450. The second video monitor 446 and the second peripheral components 450 are configured to negotiate with the second USB controller 438 to request the second power therefrom. The second power is at least a sum total of a plurality of second individual power levels corresponding with the second video monitor 446 and the second peripheral components 450 (e.g., 100 W for the second video monitor 446, 50 W for LEDs, 60 W for speakers, etc.). The second PD control 448 is configured to negotiate, via the corresponding second USB interface 410, with the first USB controller 422 to request the second power originating from the host USB controller 416.

The first video monitor 430 and the first peripheral components 432 are configured to negotiate with the first USB controller 422 to request at least the first power therefrom. The first power is the sum total of a plurality of first individual power levels corresponding with the first video monitor 430 and the first peripheral components 432 (e.g., 140 W for the first video monitor 430, 60 W for speakers, etc.). In this implementation, where the host control module 402, the first video display module 404, and the second video display module 406 are connected in a serial combination, the first PD control 436 is configured to negotiate, via the first USB interface 408, with the host USB controller 416 to request the sum total of the first power and the second power from the host USB controller 416.

In some implementations, the host USB controller 416 includes the memory devices that store computer-executable instructions which, when executed by the one or more processors, further cause the one or more processors to cause the host USB controller 416 to compare the sum total of the first power and the second power to a maximum power level capacity of the first USB interface 408 and/or the second USB interface 410 (e.g., 240 W) responsive, at least in part, to the host USB controller 416 receiving the request for the amount of power (e.g., the sum total of the first power and the second power). The memory devices store additional computer-executable instructions which, when executed by the one or more processors, further cause the one or more processors to cause the host USB controller 416 to deliver at least the first power (e.g., the first power and the second power) to the first USB controller 422 responsive, at least in part, to the host USB controller 416 determining that the requested sum total of power is less than the maximum power capacity of the USB interface 408 and/or the USB interface 410. The memory devices store additional computer-executable instructions which, when executed by the one or more processors, further cause the one or more processors to cause the first USB controller 422 to deliver at least the second power to the second USB controller 438 responsive, at least in part, to the host USB controller 416 determining that the requested sum total of the first power and the second power is less than the maximum power capacity of the USB interface 408 and/or the USB interface 410.

The memory devices store additional computer-executable instructions which, when executed by the one or more processors, further cause the host USB controller 416 to generate data associated with a remedial action responsive, at least in part, to the host USB controller 416 determining that the requested sum total of the first power and the second power exceeds the maximum power level capacity of the first USB interface 408 and/or the second USB interface 410. The first video logic subsystem 426 of the first USB controller 422 is configured to generate an input signal responsive, at least in part, to the first video logic subsystem receiving data associated with the remedial action from the host USB controller 416. The display control subsystem 428 is configured to generate a video signal responsive, at least in part, to the display control subsystem 428 receiving that input signal from the first video logic subsystem 426. The first video monitor 430 presents a notification responsive, at least in part, to the first video monitor 430 receiving the video signal from the display control subsystem 428. The notification prompts an installation of an additional USB-C cable to connect the host USB controller 416 with the first video display module 404 or the second video display module 406. In some implementations, the first PD control 436 may be configured to dynamically allocate power to the components of the gaming device 400 (e.g., by stopping delivery of power to one or more of the first peripheral components 432, etc.) responsive, at least in part, to the first USB controller 422 receiving the data associated with the remedial action from the host USB controller 416. In other implementations, the remedial action may include causing the first USB controller 422 and/or the second USB controller 438 to transmit an over-power signal to, for example, the game controller 412. The over-power signal may identify one or more peripheral components 432, 450 as being the source of the fault (e.g., by identifying one or more peripheral components 432, 450 that cause the total requested power to exceed the maximum power capacity of the first USB interface 408 and/or the second USB interface 410).

In another somewhat analogous implementation, the second video logic subsystem 442 is configured to generate an input signal responsive, at least in part, to the second video logic subsystem 422 receiving the data associated with the remedial action from the first USB controller 422. The display control subsystem 444 of the second USB controller 438 is configured to generate a video signal responsive, at least in part, to the display control subsystem 444 receiving that input signal from the second video logic subsystem 442. The second video monitor 446 presents a notification responsive, at least in part, to the second video monitor 446 receiving the video signal from the display control subsystem 444. The notification prompts an installation of an additional USB-C cable to connect the host USB controller 416 with the first video display module 404 or the second video display module 406. In some implementations, the second PD control 448 may be configured to dynamically allocate power to the components of the gaming device 400 (e.g., by stopping delivery of power to one or more of the second peripheral components 450, etc.) responsive, at least in part, to the second USB controller 438 receiving the data associated with the remedial action from the first USB controller 422.

The gaming device 400 includes a Unified USB Data and Power Distribution System having the host USB controller 416, the first USB controller 422, and the second USB controller 438. The Unified USB Data and Power Distribution includes the plurality of processors and the plurality of memory devices (e.g., non-transitory computer readable media or CRM). The one or more memory devices store computer-executable instructions which, when executed by the one or more processors, cause the components as described above to communicate with one another for power delivery and data transmission. More specifically, the one or more memory devices store computer-executable instructions which, when executed by the one or more processors, cause the one or more processors to cause the second video monitor 446 and the one or more second peripheral components to negotiate with the second USB controller 438 to request at least the second power originating from the host USB controller 408. The second power is at least the total sum of second individual power levels corresponding with the second video monitor 446 and the one or more second peripheral components 450. The one or more memory devices store additional computer-executable instructions which, when executed by the one or more processors, cause the one or more processors to cause the second power delivery subsystem 448 of the second USB controller 438 to negotiate, via the corresponding second USB interface 410, with the first USB controller 422 to request the second power (e.g., 100 W for the second video monitor 446).

The one or more memory devices store additional computer-executable instructions which, when executed by the one or more processors, cause the one or more processors to cause the first video monitor 430 and the one or more first peripheral components 432 to negotiate with the first USB controller 422 to request the first power originating from the host USB controller 416. The first power is at least a sum total of first individual power levels corresponding with the first video monitor 430 and the one or more first peripheral components 432. The one or more memory devices store additional computer-executable instructions which, when executed by the one or more processors, cause the one or more processors to cause the first power delivery subsystem 436 of the first USB controller 422 to negotiate, via the first USB interface 408, with the host USB controller 416 to request the sum total of the first power and the second power (e.g., 140 W for the first video monitor 430 and 100 W for the second video monitor 446).

The one or more memory devices store additional computer-executable instructions which, when executed by the one or more processors, cause the one or more processors to cause at least the first power (e.g., the sum of the first power and the second power, etc.) to be delivered, via the first USB interface 408, from the host USB controller 416 of the host control module 402 to the first USB controller 422 of the first video display module 404 responsive, at least in part, to the processor receiving from the first USB controller 422 the request for the first power and the second power. The one or more memory devices store computer-executable instructions which, when executed by the one or more processors, cause the one or more processors to cause the first power to be allocated from the first USB controller 422 to the components of the first video display module 404 (e.g., the first video monitor 430) and the first peripheral components 432 responsive, at least in part, to the first USB controller 422 receiving the amount of power from the host USB controller 416. The one or more memory devices store computer-executable instructions which, when executed by the one or more processors, cause the one or more processors to cause the second power to be delivered, via the additional second USB interface 410, from the first USB controller 422 to the second video display module 406 responsive, at least in part, to the first USB controller 422 receiving the amount of power from the host USB controller 416. The one or more memory devices store computer-executable instructions which, when executed by the one or more processors, cause the one or more processors to cause the second power to be allocated from the second USB controller 438 to the components of the second video display module 406 (e.g., the second video monitor 446 and the second peripheral components 450) responsive, at least in part, to the second USB controller 438 receiving the amount of power from the first USB controller 422.

In other implementations, the one or more memory devices store computer-executable instructions which, when executed by the one or more processors, cause the one or more processors to initiate a remedial action (e.g., dynamically allocate or scale back power delivered to one or more components, provide a notification that prompts an installation of an additional USB-C cable, etc.) when the power level required by the first video display module 404 and the second video display module 406 exceed the maximum power level capacity of either one of the USB-C cables 408, 410. The one or more memory devices store additional computer-executable instructions which, when executed by the one or more processors, cause the one or more processors to cause the host USB controller 416 to compare the amount of power (e.g., 714 W for two video monitors, two speakers, and LEDs, etc.) to the maximum power level capacity (e.g., 240 W) of the USB interface 408. The one or more memory devices store additional computer-executable instructions which, when executed by the one or more processors, cause the one or more processors to cause, responsive, at least in part, to the host USB controller 416 determining that the amount of power exceeds the maximum power level capacity, the host USB controller 416 to generate data associated with a remedial action.

The one or more memory devices store additional computer-executable instructions which, when executed by the one or more processors, cause the one or more processors to cause, responsive, at least in part, to the first video logic subsystem 426 of the first USB controller 422 receiving the data associated with the remedial action from the host USB controller 416, the first video logic subsystem 426 to generate an input signal. The one or more memory devices store additional computer-executable instructions which, when executed by the one or more processors, cause the one or more processors to cause, responsive, at least in part, to the display control subsystem 428 of the first video display module 404 receiving the input signal from the first video logic subsystem 426, the display control subsystem 428 to generate a video signal. The one or more memory devices store additional computer-executable instructions which, when executed by the one or more processors, cause the one or more processors to cause, responsive, at least in part, to the first video monitor 430 receiving the video signal from the display control subsystem 428, the first video monitor 430 to present a notification. In some implementations, the notification includes a prompt to install an additional USB-C cable to connect the host USB controller 416 with the first video display module 404 or the second video display module 406. In other implementations, the one or more memory devices store additional computer-executable instructions which, when executed by the one or more processors, cause the one or more processors to cause, responsive, at least in part, to the first power delivery subsystem 436 of the first USB controller 422 receiving the data associated with the remedial action from the host USB controller 416, the first power delivery subsystem 436 to stop delivering power to one or more of the first peripheral components 432.

In a somewhat analogous manner, the one or more memory devices store additional computer-executable instructions which, when executed by the one or more processors, cause the one or more processors to cause, responsive, at least in part, to the second video logic subsystem 442 of the second USB controller 438 receiving the data associated with the remedial action from the first USB controller 422, the second video logic subsystem 442 to generate an input signal. The one or more memory devices store additional computer-executable instructions which, when executed by the one or more processors, cause the one or more processors to cause, responsive, at least in part, to the display control subsystem 444 of the second video display module 406 receiving the input signal from the second video logic subsystem 442, the display control subsystem 444 to generate a video signal. The one or more memory devices store additional computer-executable instructions which, when executed by the one or more processors, cause the one or more processors to cause, responsive, at least in part, to the second video monitor 446 receiving the video signal from the display control subsystem 444, the second video monitor 446 to present a notification. In one implementation, the notification includes a prompt to install an additional USB-C cable to connect the host USB controller 416 with the first video display module 404 or the second video display module 406. In other implementations, the one or more memory devices store additional computer-executable instructions which, when executed by the one or more processors, cause the one or more processors to cause, responsive, at least in part, to the second power delivery subsystem 448 of the second USB controller 438 receiving the data associated with the remedial action from the first USB controller 422, the second power delivery subsystem 448 to stop delivering power to one or more of the second peripheral components 450.

Figure 5:
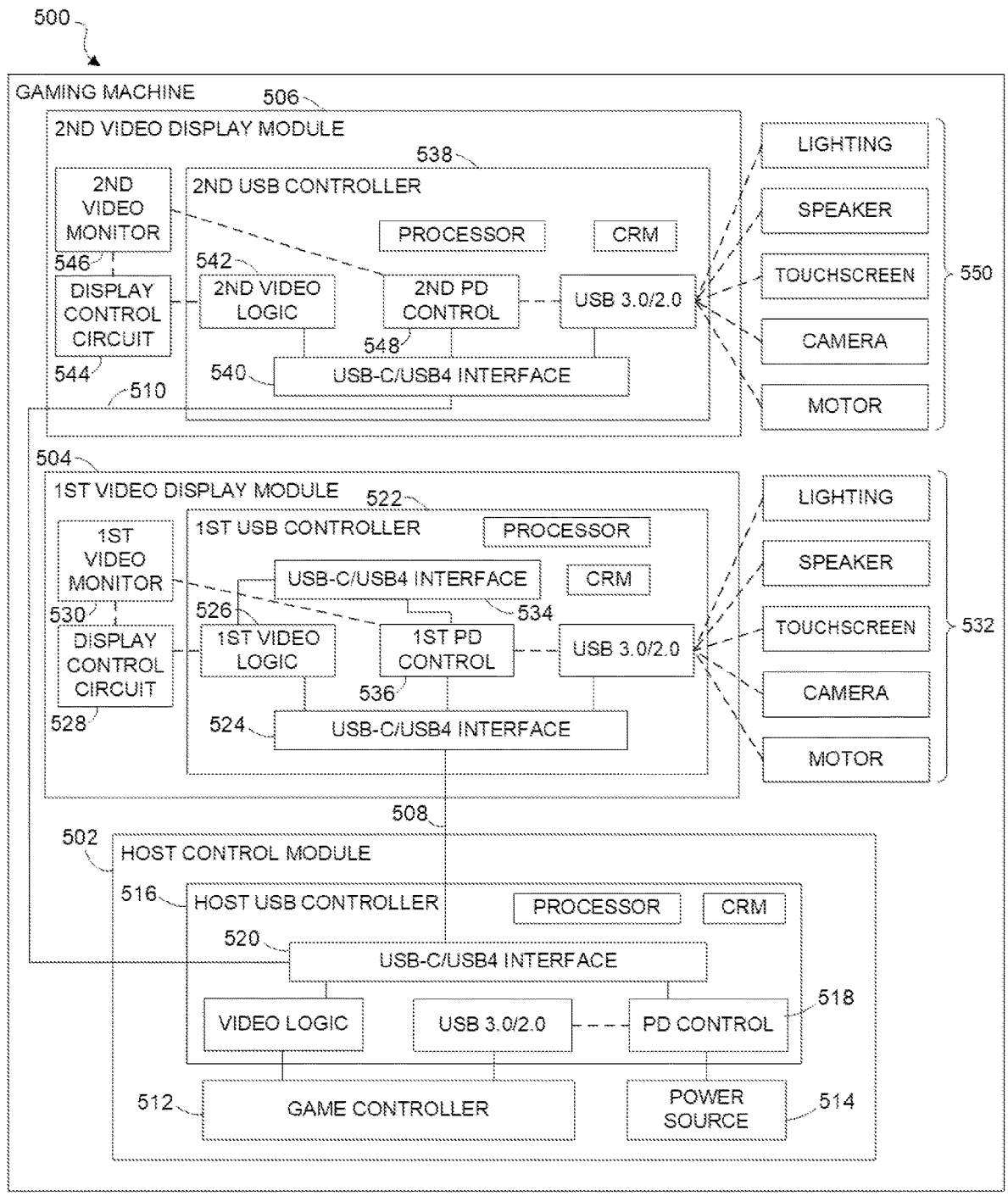
FIG. 5 depicts, in block diagram form, another implementation of the gaming device of FIG. 4, illustrating USB interfaces connecting a first video display module and a second video display module in a parallel combination with a host control module for power delivery and data transmission.

Referring to FIG. 5, another example of gaming device 500 is somewhat similar to the gaming device of FIG. 4. To avoid undue repetition, elements in the implementation of FIG. 5 that are analogous to elements shown in FIG. 4 are called out with numbers that share the same last two digits as those analogous elements in FIG. 4. Thus, the discussion provided above with respect to the elements of the implementation of FIG. 4 will be understood to be equally applicable to the analogous elements in FIG. 5 unless indicated otherwise. In the interest of conciseness, discussion of these elements that would be redundant of earlier discussion herein of similar elements is not provided, with the understanding that the earlier discussion of such elements is applicable to these similar elements in FIG. 5.

While the gaming machine 400 of FIG. 4 includes the host control module 402, the first video display module 404, and the second video display module 406 communicatively and electrically connected in serial combination, the gaming machine 500 of FIG. 5 includes the first video display module 504 and the second video display module 506 communicatively and electrically connected directly to the host control module in parallel combination. The second USB controller 406 of FIG. 4 is indirectly connected to the host USB controller 416 via the first USB controller 422. While the first USB interface 408 of FIG. 4 must carry the total sum of the first power and the second power, the first USB interface 508 of FIG. 5 may carry only the first power corresponding with the first video display module 404. For that reason, in some implementations, the parallel combination or arrangement of the modules in FIG. 5 may be an additional remedial action when the processors determine that the sum total of power exceeds the maximum power capacity of the first USB interface 508. Put another way, the first video monitor 530 and/or the second video monitor 546 may present the notification to prompt connecting, using the second USB interface 410, the second USB controller 438 directly to the host USB controller 416 instead of indirectly connecting the USB controller 538 to the host USB controller via the first USB controller 422 and the first USB interface 408.

Figure 6:
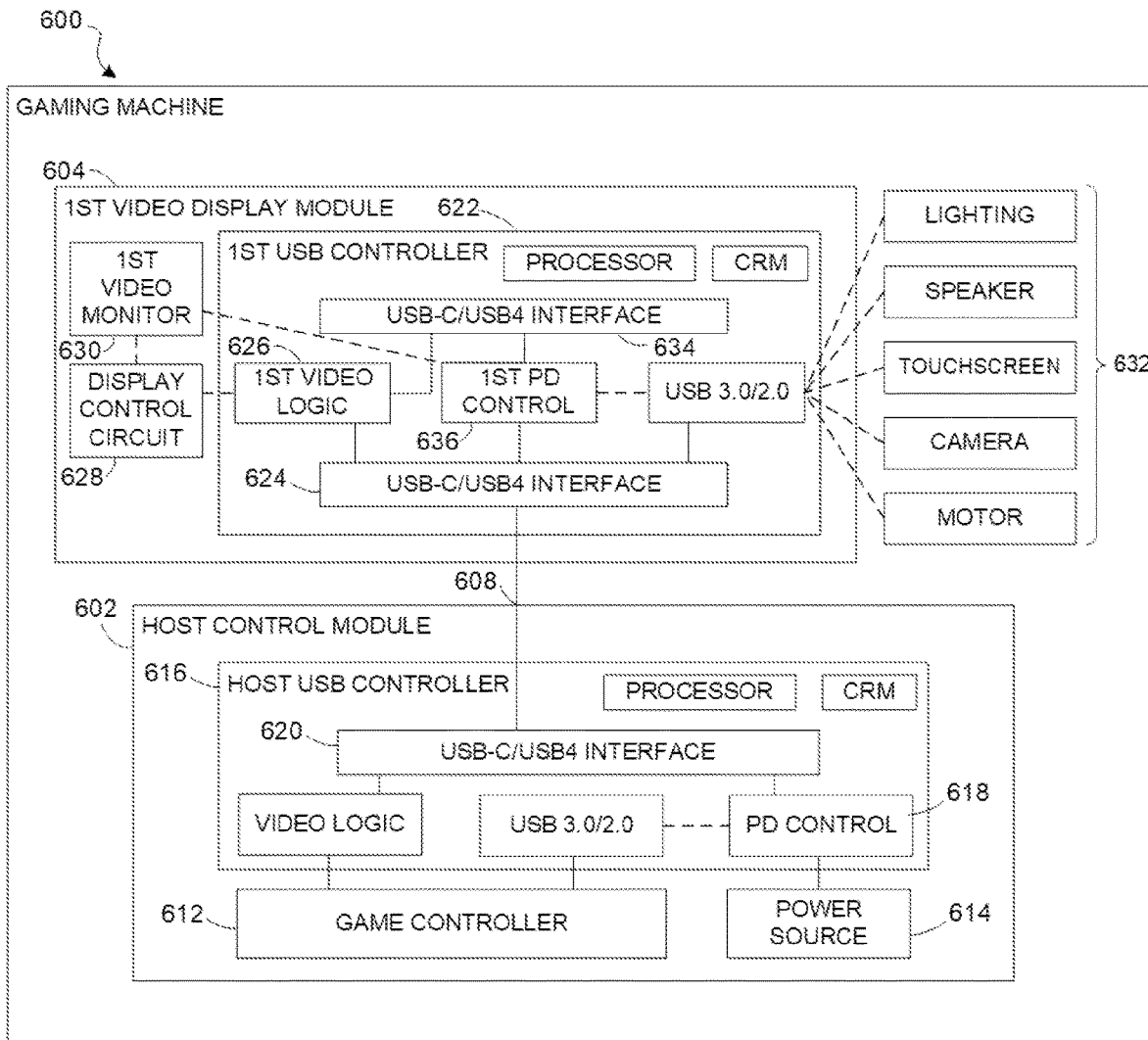
FIG. 6 depicts, in block diagram form, yet another implementation of the gaming device of FIG. 4, illustrating the gaming device having a single video display module.

Referring to FIG. 6, another example of a gaming machine 600 is somewhat similar to the gaming device 400 of FIG. 4. To avoid undue repetition, elements in the implementation of FIG. 6 that are analogous to elements shown in FIG. 4 are called out with numbers that share the same last two digits as those analogous elements in FIG. 4. Thus, the discussion provided above with respect to the elements of the implementation of FIG. 4 will be understood to be equally applicable to the analogous elements in FIG. 6 unless indicated otherwise. In the interest of conciseness, discussion of these elements that would be redundant of earlier discussion herein of similar elements is not provided, with the understanding that the earlier discussion of such elements is applicable to these similar elements in FIG. 6.

While the gaming device 400 of FIG. 4 includes both the first video display module 404 and the second video display module 406, the gaming device 600 of FIG. 6 includes a single video display module 604 without any additional video display modules. In other implementations, the gaming device 600 may include three or more video display modules.

Figure 7:
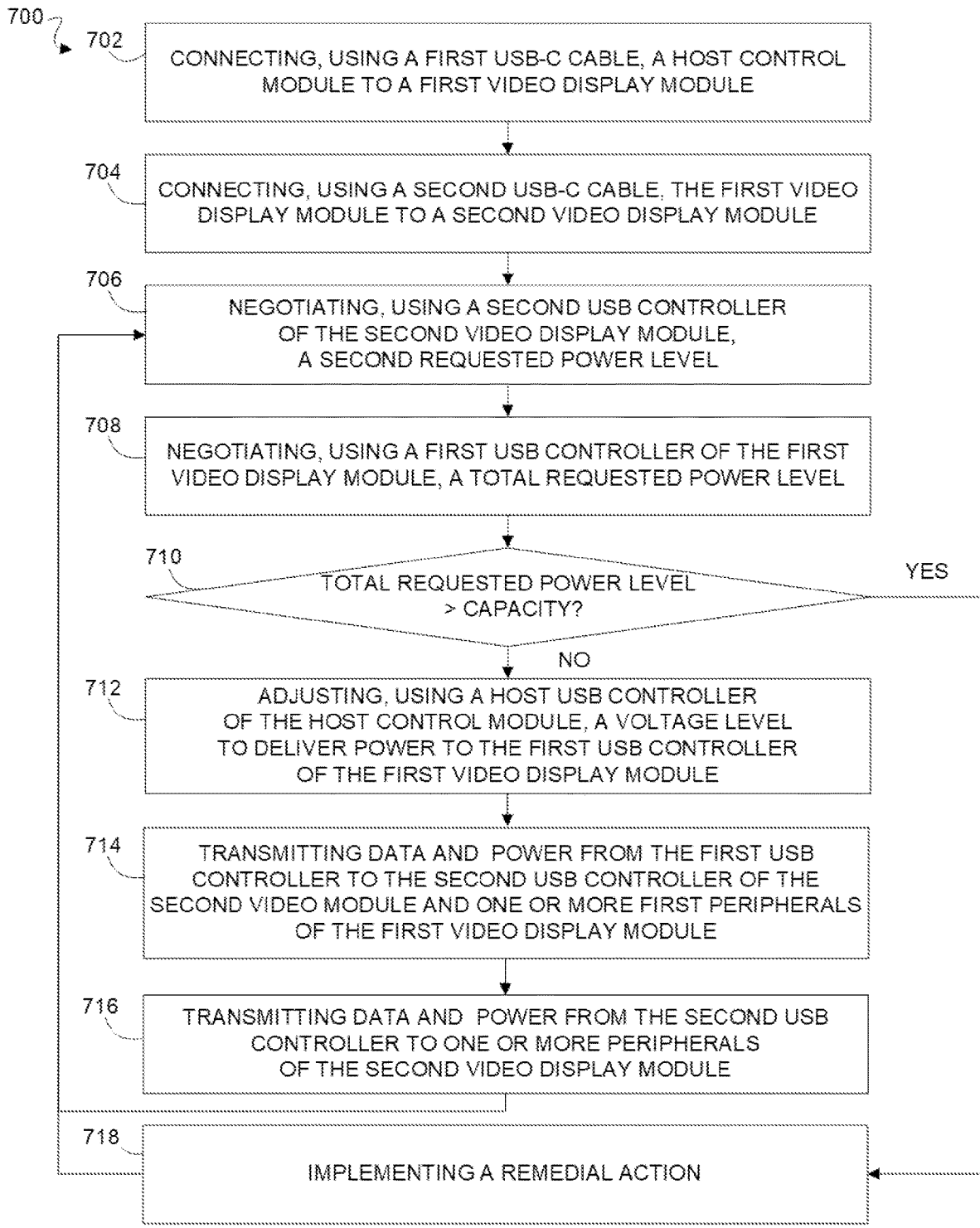
FIG. 7 depicts a flow chart of an example method of configuring the gaming device of FIG. 4, including using a first USB-C cable to negotiate for power from a host to a connected first video display module and providing suitable power to a second video display module from the first video display module when the second USB-C cable is connected via negotiation.

FIG. 7 illustrates a flow chart of one example of a method 700 for configuring the gaming device 400 of FIG. 4 to deliver power and data via the USB-C cables 408, 410. The method includes using a first USB-C cable 408 to negotiate for power (e.g., maximum power that a host can provide) from the host to a connected first video display module and providing power to a second video display module 406 from the first video display module 404 when the second USB-C cable 410 is connected via negotiation. The maximum power from the host will not be consumed when the second video display module is not connected, even though the first video display module has the capability to deliver that power. The method 700 begins at block 702 with connecting, using the first USB interface 408, the host control module 402 (e.g., the output interface 420) to the first video display module 404 (e.g., the input interface 424). The method 700 then proceeds to block 704.

At block 704, the method 700 includes connecting, using the second USB interface 410, the first video display module 404 (i.e., via the output interface 434) to the second video display module 406 (i.e., via the input interface 440). The method 700 further includes transmitting power from the power source 414 of the host control module to the host USB controller 416 (e.g., the PD control 418). The method 700 further includes transmitting data from the game controller 412 of the host control module 402 to the host USB controller 416. The method 700 then proceeds to block 706 to determine power needs for the components of the gaming device 400.

At block 706, the method 700 includes negotiating, using the second PD control 448 of the second USB controller 438, with the first USB controller 422 via the corresponding second USB interface 410 to request the second power. More specifically, the method 700 includes negotiating, using the second video monitor 446 and the second peripheral components 450 collectively, with the second USB controller 438 to request the second power. The second power is the sum total of the individual power levels corresponding with the second video monitor 446 and/or second peripheral components 450 (e.g., 100 W for the second video monitor 446, 50 W for LEDs, etc.). The method 700 then proceeds to block 708.

At block 708, the method 700 includes negotiating, using the first PD control 436 of the first USB controller 422, with the host USB controller 416 via the first USB interface 408 to request at least the first power (e.g., the sum total of the first power and the second power). More specifically, the sum total of power includes the first power corresponding with the first video display module 404 and the second power corresponding with the second video display module 406. To identify the sum total of power, the method 700 includes negotiating, using the first video monitor 430 and the first peripheral components 432 collectively, with the first USB controller 422 to request the first power corresponding with the first video monitor 430 and/or the first peripheral components 432 (e.g., 140 W for the second video monitor 446, 50 W for LEDs, 60 W for speakers, etc.). The first requested power level is at least the sum total of the first individual power levels corresponding with the first video monitor 430 and/or the first peripheral components 432. The method 700 then proceeds to block 710.

At block 710, the method 700 initiates a remedial action subroutine that includes comparing, using the host USB controller 416, the amount of power to the maximum power level capacity of the USB interface 408 (e.g., 240 W). In other implementations, the gaming device 400 may use other cables with maximum power level capacities above or below 240 W, and the host USB controller 416 may compare the amount of power with other thresholds above or below the maximum capacity of the USB-C cables 408, 410 or other cables. If the host USB controller 416 determines that the amount of power does not exceed the maximum power level capacity of the USB interface 408, the method 700 proceeds to block 712. If the host USB controller 416 determines that the amount of power exceeds the maximum power level capacity of the USB interface 408, the method 700 proceeds to block 718.

At block 712, the method 700 includes adjusting, using the host USB controller 416 of the host control module 402, a voltage level to deliver via the first USB interface 408 the first power to the first USB controller 422 of the first video display module 404. In one implementation where the USB-C cable implements the USB Power Delivery Specification Revision 3.1, the PD control 418 may adjust the voltage level to 28 Volts to provide a total requested power level of 140 Volts, 36 Volts to provide a total requested power level of 180 W, and 48 Volts to provide a total requested power level of 240 W. The method 700 includes transmitting, using the first USB interface 408, both the power and the data from the host USB controller 416 to the first USB controller 422 of the first video display module 404. The method 700 then proceeds to block 714.

At block 714, the method includes transmitting both the power and the data from the first USB controller 422 to the first video monitor 430 and one or more first peripheral components 432 of the first video display module 404. The first USB controller 422 allocates the first power such that the first video monitor 430 and the first peripheral components 432 receive at least the first power (e.g., the sum total of the individual power levels that were negotiated in block 708). The method 700 includes further allocating the first power to the first video monitor 430 and the first peripheral components 432 and the second power to the second USB controller 438. The method 700 includes transmitting, using the corresponding second USB interface 410, both the power (e.g., the second power level) and the data from the first USB controller 422 to the second USB controller 438 of the second video display module 406. The method then proceeds to block 716.

At block 716, the method 700 includes transmitting the data and allocating at least some of the second power originating from the host USB controller 416 to the second video monitor 446 and one or more second peripheral components 450 of the second video display module 406. The second USB controller 438 allocates at least some of the second power to the second video monitor 446 and/or at least some of the second power to the second peripheral components 450 based on the individual power levels that were negotiated in block 706. The method 700 then returns to block 706.

At block 718, the method 700 includes implementing a remedial action responsive, at least in part, to the host USB controller 416 determining that the amount of power requested by the first video display module 404 and the second video display module 406 (i.e., the sum total of the first power and the second power) exceeds the maximum power level capacity of the USB interface 408. The method 700 includes generating, using the host USB controller 416, data associated with a remedial action responsive, at least in part, to the host USB controller 416 determining that the amount of power exceeds the maximum power level capacity. The method 700 further includes generating, using the first video logic subsystem 426 of the first USB controller 422, the input signal responsive, at least in part, to the first video logic subsystem 426 receiving the data associated with the remedial action from the host USB controller 416. The method 700 further includes generating, using the display control subsystem 428 of the first video display module 404, the video signal responsive, at least in part, to the display control subsystem 428 receiving the input signal from the first video logic subsystem 426. The method 700 further includes presenting, using the first video monitor 430, the notification responsive, at least in part, to the first video monitor 430 receiving the video signal from the display control subsystem 428. The method 700 further includes requesting, using the notification, that a technician install an additional USB-C cable to connect the host USB controller 416 with the first video display module 404 or the second video display module 406.

In some implementations, the method 700 further includes generating, using the second video logic subsystem 442 of the second USB controller 438, the input signal responsive, at least in part, to the second video logic subsystem 442 receiving the data associated with the remedial action from the first USB controller 422. The method 700 further includes generating, using the display control subsystem 444 of the second video display module 406, the video signal responsive, at least in part, to the display control subsystem 444 receiving the input signal from the second video logic subsystem 442. The method 700 further includes presenting, using the second video monitor 446, the notification responsive, at least in part, to the second video monitor 446 receiving the video signal from the display control subsystem 444. The method 700 further includes prompting, using the notification, an installation of an additional USB-C cable to connect the host USB controller 416 with the first video display module 404 or the second video display module 406.

In other implementations, the method 700 further includes stopping, using the first PD control 436 of the first USB controller 422, delivery of power to the first video monitor and/or one or more of the first peripheral components 432 responsive, at least in part, to the first USB controller 422 receiving the data associated with the remedial action from the host USB controller 416. The method 700 further includes stopping, using the second PD control 448 of the second USB controller 438, delivery of power to the second video monitor 446 and/or one or more of the second peripheral components 450 responsive, at least in part, to the second USB controller receiving the data associated with the remedial action from the first USB controller 422.

In an embodiment, the USB-C cable may provide greater than 240 W of power to the gaming system 400. For example, the interface(s) may be operable to convey power at a range of values up to 240 W, although more or less power is considered. Moreover, in some examples, power conversion circuitry may be included in one or more of the interfaces to receive and condition power for use with the associated gaming device, and/or for transmission to a connected interface. In some examples, the host control module 402 may be a computer with a central controller (e.g., processor) connected to and/or controlling operation of the interfaces 420, 424, 434, 440.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items. Similarly, the term "set" or "subset" should not be viewed, in itself, as necessarily encompassing a plurality of items—it will be understood that a set or a subset can encompass only one member or multiple members (unless the context indicates otherwise).

In recognition of the possibility of such distributed processing arrangements, the term "collectively," as used herein with reference to memory devices and/or processors or various other items, should be understood to indicate that the referenced collection of items has the characteristics or provides the functionalities that are associated with that collection. For example, if a host USB controller, first USB controller, and second USB controller collectively store instructions for causing A, B, and C to occur, this encompasses at least the following scenarios:

a) The host USB controller stores instructions for causing A, B, and C to occur, but the first USB controller and/or the second USB controller store no instructions that cause A, B, and C to occur.

b) The first USB controller and/or the second USB controller store instructions for causing A, B, and C to occur, but the host USB controller stores no instructions that cause A, B, and C to occur.

c) The host USB controller stores instructions for causing a proper subset of A, B, and C to occur, e.g., A and B but not C, and the first USB controller and/or the second USB controller store instructions that cause a different proper subset of A, B, and C to occur, e.g., C but not A and B, where instructions for causing each of A, B, and C to occur are respectively stored on one or more of the host USB controller, the first USB controller, and the second USB controller.
d) The host USB controller stores instructions for causing a subset of A, B, and C to occur, e.g., A and B but not C, and the first USB controller and/or the second USB controller store instructions that cause a different subset of A, B, and C to occur, e.g., B and C but not A, where instructions for causing each of A, B, and C to occur are respectively stored on one or more of the host USB controller, the first USB controller, and the second USB controller.
e) The host USB controller stores instructions for causing A and a portion of B to occur, and the first USB controller and/or the second USB controller store instructions that cause C and the remaining portion of B to occur.

In all of the above scenarios, among the host USB controller, the first USB controller, and the second USB controller, there are, collectively, instructions that are stored for causing A, B, and C to occur, i.e., such instructions are stored on one or more USB controllers and it will be recognized that using the term "collectively," e.g., the host USB controller, the first USB controller, and the second USB controller, collectively, store instructions for causing A, B, and C to occur, encompasses all of the above scenarios as well as additional, similar scenarios.

Similarly, a collection of processors, e.g., a first set of one or more processors and a second set of one or more processors, may be caused, collectively, to perform one or more actions, e.g., actions A, B, and C. As with the previous example, various permutations fall within the scope of such "collective" language:
a) The first set of one or more processors may be caused to perform each of A, B, and C, and the second set of one or more processors may not perform any of A, B, or C.
b) The second set of one or more processors may be caused to perform each of A, B, and C, and the first set of one or more processors may not perform any of A, B, or C.
c) The first set of one or more processors may be caused to perform a proper subset of A, B, and C, and the second set of one or more processors may be caused to perform a different proper subset of A, B, and C to be performed such that between the two sets of processors, all of A, B, and C are caused to be performed.
d) The first set of one or more processors may be caused to perform A and a portion of B, and the second set of one or more processors may be caused to perform C and the remainder of B.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A gaming device comprising:
a host control module having a host USB controller, a game controller communicatively connected to the host USB controller to transmit data, and a power source electrically connected to the host USB controller to deliver power;
a first video display module having a first USB controller and a first video monitor communicatively and electrically connected to the first USB controller; and
a second video display module having a second USB controller and a second video monitor communicatively and electrically connected to the second USB controller;
wherein the first USB controller is configured to receive, via a first USB interface, first power and first data originating from the host USB controller and to transmit the first data and deliver at least some of the first power to the first video monitor;
wherein the second USB controller is configured to receive, via a second single USB interface, second power and second data originating from the host USB controller and to transmit the second data and to deliver at least some of the second power to the second video monitor and the one or more second peripheral components; and
wherein a Unified USB Data and Power Distribution System comprises the host USB controller, the first USB controller, and the second USB controller, and the Unified USB Data and Power Distribution System comprises:
a plurality of processors; and
a plurality of memory devices, the one or more memory devices storing computer-executable instructions which, when executed by the one or more processors, cause the one or more processors to cause:
the processors to collectively deliver at least the first power to the first USB controller via the first USB interface responsive, at least in part, to the one or more processors receiving a request for the first power from the first USB controller via the first USB interface, and
the processors to collectively allocate at least some of the first power to the first video monitor and at least some of the second power to the second video monitor responsive, at least in part, to the first USB controller receiving the first power originating from the host USB controller and the second USB controller receiving the second power originating from the host USB controller.

2. The gaming device of claim 1, wherein the host control module is communicatively and electrically connected to the first video display module, and the first video display module is communicatively and electrically connected to the second video display module, thereby connecting the host control module, the first video display module, and the second video display module in a serial combination.

3. The gaming device of claim 2, wherein the memory devices store computer-executable instructions which, when executed by the one or more processors, cause the one or more processors to cause:
the processors to deliver an amount of power to the first video display module, the amount of power being at least the sum total of the first power and the second power; and
the processors to allocate at least the second power from the first USB controller to the second USB controller responsive, at least in part, to the first video display module receiving the amount of power.

4. The gaming device of claim 1, wherein the host control module is communicatively and electrically connected directly to the first video display module, and the host control module is further communicatively and electrically connected directly to the second video display module, thereby communicatively and electrically connecting the first video display module and the second video display module in a parallel combination with the host USB controller.

5. The gaming device of claim 4, wherein the memory devices store computer-executable instructions which, when executed by the one or more processors, cause the one or more processors to cause:
the processors to deliver an amount of power to the first video display module, the amount of power being at least the first power; and
the processors to deliver an additional amount of power to the second video display module, the additional amount of power being at least the second power.

6. The gaming device of claim 1, wherein one or both of the first USB interface and the second USB interface include a USB cable capable of delivering at least 240 W and carrying a data transfer speed of at least 40 Gbps.

7. A method of configuring a gaming device, the method comprising:
transmitting, using a first USB interface, first power and first data originating from a host USB controller to a first USB controller of a first video display module;
transmitting the first data and at least some of the first power from the first USB controller to a first video monitor of the first video display module;
transmitting, using a second USB interface, second power and second data originating from the host USB controller to a second USB controller of a second video display module;
transmitting the second data and at least some of the second power from the second USB controller to a second video monitor;
transmitting the first data and at least some of the first power from the first USB controller to one or more first peripheral components;
transmitting the second data and at least some of the second power from the second USB controller to one or more second peripheral components;
comparing, using the host USB controller, the amount of power to maximum power level capacity of the USB interface; and
generating, using the host USB controller, data associated with a remedial action responsive, at least in part, to the host USB controller determining that the amount of power exceeds the maximum power level capacity.

8. The method of claim 7, further comprising negotiating, using a first power delivery subsystem via the first USB interface, with the host USB controller to request the first power.

9. The method of claim 8, further comprising negotiating, using the first video monitor and the one or more first peripheral components collectively, with the first delivery power subsystem to request the first power, and the first power is at least a sum total of a plurality of first individual power levels corresponding with the first video monitor and the one or more first peripheral components.

10. The method device of claim 9, further comprising negotiating, using a second power delivery subsystem of the second USB controller via the second USB interface, with the first USB controller to request the second power.

11. The method of claim 8, further comprising negotiating, using the second video monitor and the one or more second peripheral components collectively, with the second power delivery subsystem to request the second power, and the second power is at least a sum total of a plurality of second individual power levels corresponding with the second video monitor and the one or more second peripheral components.

12. The method of claim 7, further comprising:
generating, using a first video logic subsystem of the first USB controller, an input signal responsive, at least in part, to the first video logic subsystem receiving the data associated with the remedial action from the host USB controller,
generating, using a display control subsystem of the first video display module, a video signal responsive, at least in part, to the display control subsystem receiving the input signal from the first video logic subsystem;
presenting, using the first video monitor, a notification responsive, at least in part, to the first video monitor receiving the video signal from the display control subsystem; and
prompting, using the notification, an installation of an additional USB interface to connect the host USB controller with the first video display module or the second video display module.

13. The method of claim 12, further comprising:
generating, using a second video logic subsystem of the second USB controller, an input signal responsive, at least in part, to the second video logic subsystem receiving the data associated with the remedial action from the first USB controller;
generating, using a display control subsystem of the second video display module, a video signal responsive, at least in part, to the display control subsystem receiving the input signal from the second video logic subsystem;
presenting, using the second video monitor, a notification responsive, at least in part, to the second video monitor receiving the video signal from the display control subsystem; and
prompting, using the notification, an installation of an additional USB interface to connect the host USB controller with the first video display module or the second video display module.

14. One or more non-transitory computer-readable media storing computer-executable instructions which, when executed by one or more processors, cause the one or more processors to:
cause a first power originating from a host USB controller of a host control module to be delivered, via a first USB interface, to a first USB controller of a first video display module responsive, at least in part, to the processor receiving from the first USB controller a request for the first power,
cause at least some of the first power to be allocated from the first USB controller to a first video monitor of the first video display module responsive, at least in part, to the first USB controller receiving the first power originating from the host USB controller,
cause a second power originating from the host USB controller of the host control module to be delivered, via a second USB interface, to a second video display module responsive, at least in part, to the processor receiving from the first USB controller a request for the first power,
cause at least some of the second power to be allocated from a second USB controller to a second video monitor of the second video display module responsive, at least in part, to the second USB controller receiving the second power originating from the host USB controller, and cause a first video monitor and one or more first peripheral components to negotiate with the first USB controller to collectively request the first power, and the first power being at least a sum total of a plurality of first individual power levels corresponding with the first video monitor and the one or more first peripheral components.

15. The one or more non-transitory computer-readable media of claim 14, wherein the one or more computer-readable media further store additional computer-executable instructions which, when executed by one or more processors, cause the one or more processors to:

cause a first power delivery subsystem of the first USB controller to negotiate, via the first USB interface, with the host USB controller to request at least the first power.

16. The one or more non-transitory computer-readable media of claim 15, wherein the one or more computer-readable media further store additional computer-executable instructions which, when executed by one or more processors, cause the one or more processors to:

cause a second video monitor and one or more second peripheral components to negotiate with the second USB controller to collectively request the second power, and the second power being at least a sum total of a plurality of second individual power levels corresponding with the second video monitor and the one or more second peripheral components.

* * * * *